Nov. 12, 1940.   H. M. JONES   2,221,482
MEASURING DEVICE
Filed May 9, 1936   4 Sheets-Sheet 4

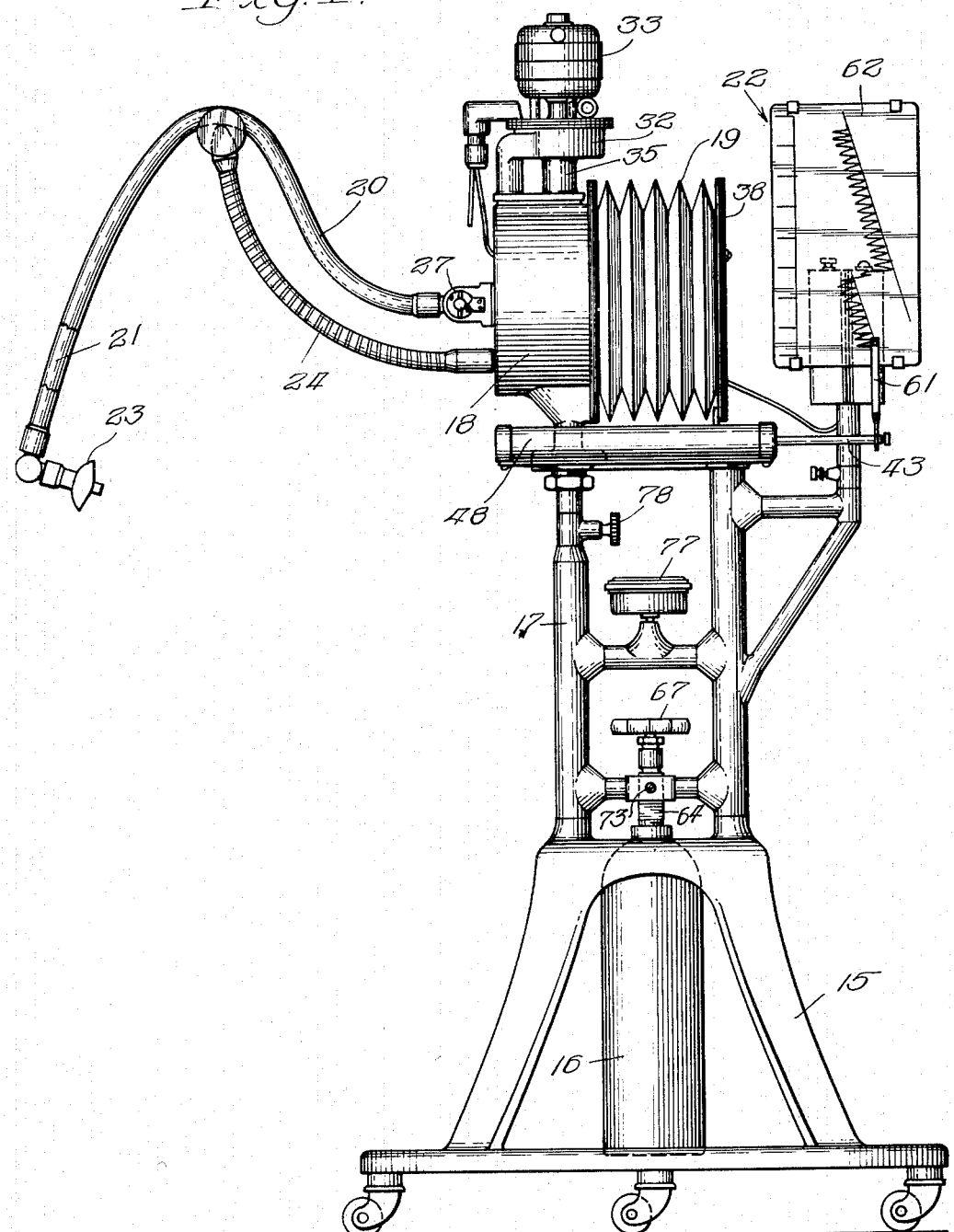

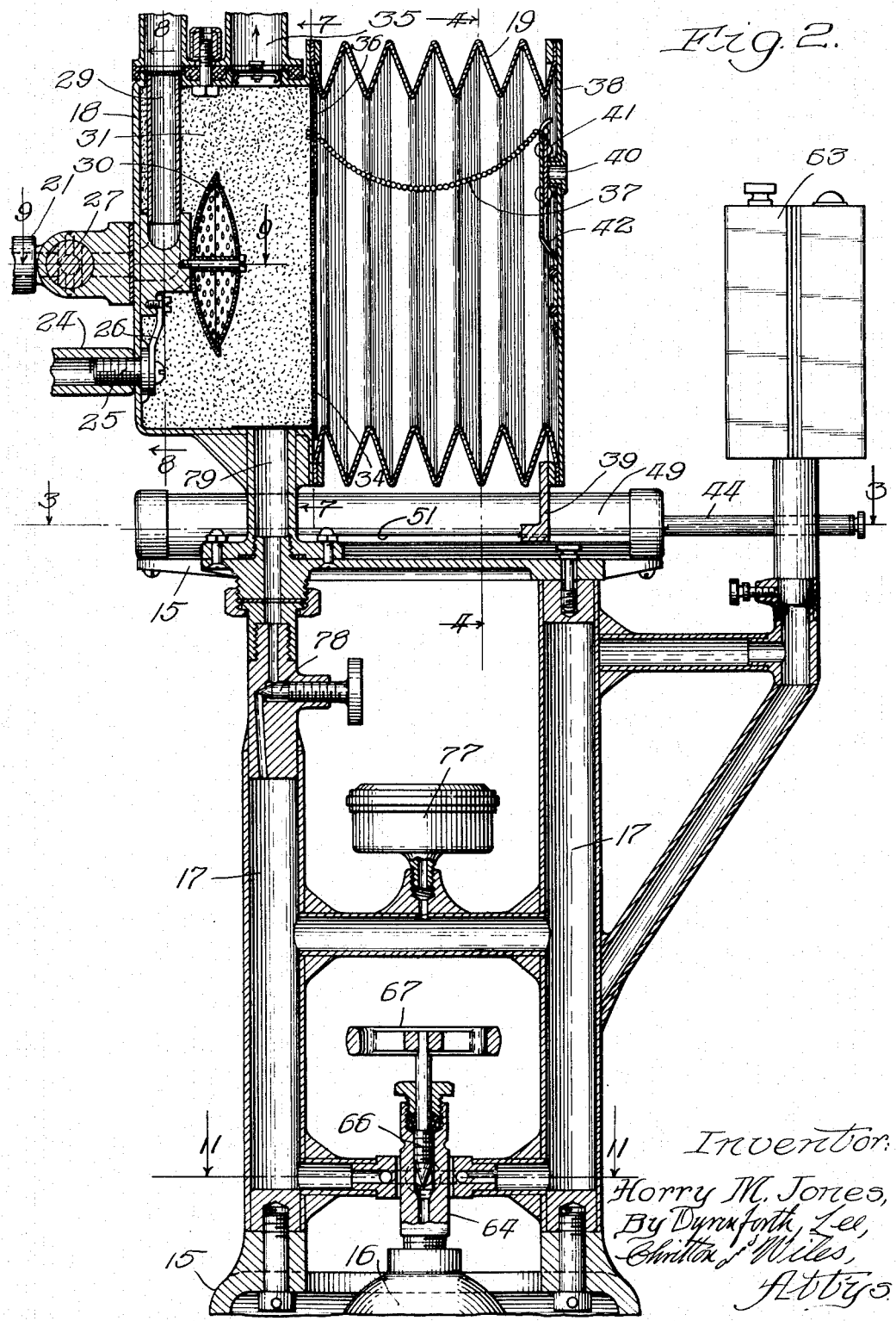

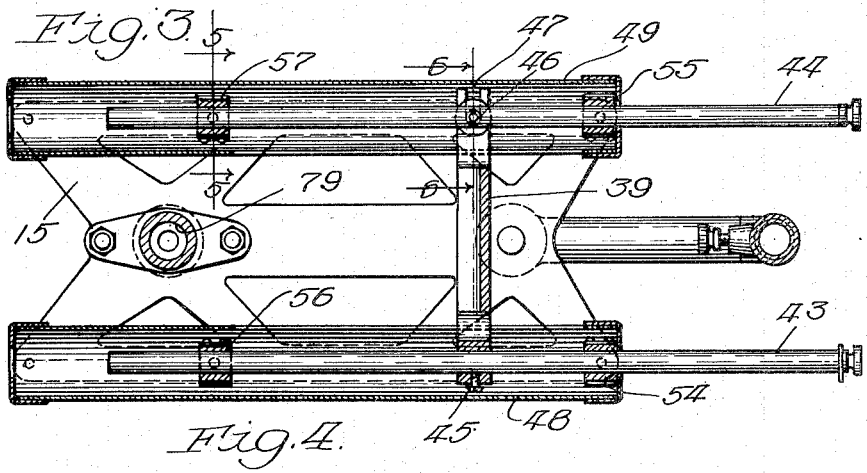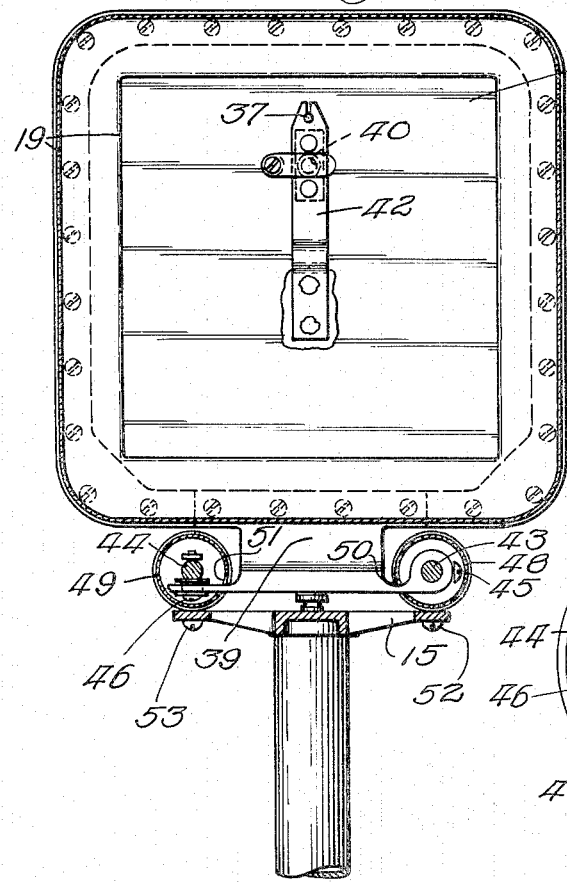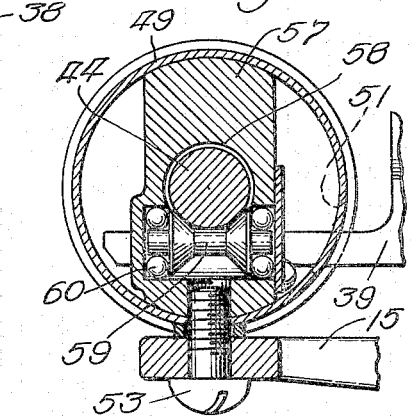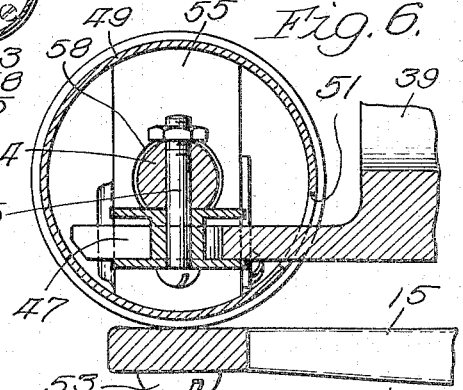

Inventor.
Harry M. Jones,
By Dynaforth, Lee, Chritton & Wiles,
Attys.

Patented Nov. 12, 1940

2,221,482

UNITED STATES PATENT OFFICE 2,221,482

MEASURING DEVICE

Horry M. Jones, Chicago, Ill.

Application May 9, 1936, Serial No. 78,942

10 Claims. (Cl. 128—191)

This invention relates to improvements in measuring devices, and more especially to a measuring device adapted for measuring the amount and rate of oxygen consumption by human beings in the breathing process, of the general character of that shown in my earlier United States Patent No. 1,474,904, dated November 20, 1923.

One of the purposes of the measurement of the rate of oxygen consumption is to determine the rate of metabolism, to diagnose pathological conditions, and the like. The improved measuring device disclosed here has distinct improvements over that shown in my earlier patent, to which reference was made above.

One of the features of this invention is the provision of an improved oxygen bag, in the form of an expansible bellows; another feature of this invention is an improved supporting means for the expansible bellows; a further feature of this invention is the provision of a safety valve for said bellows; yet another feature of this invention is an improved check and release valve in connection with the oxygen measuring chamber; other features and advantages of this invention will be apparent from the following specification and the drawings, in which—

Figure 7:
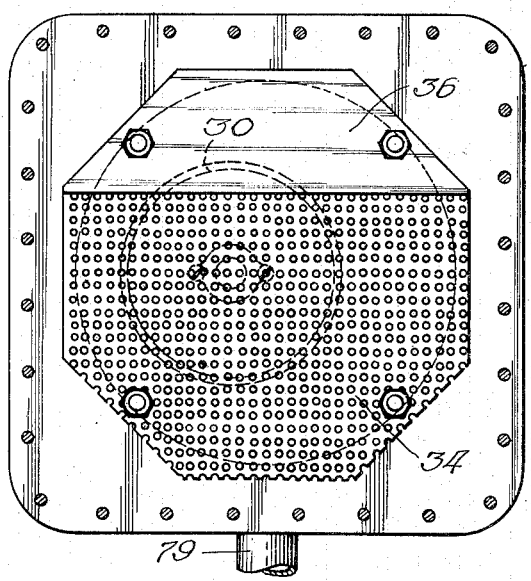
Figure 8:
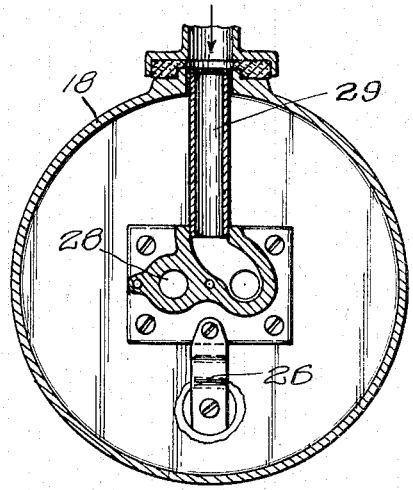
Figure 9:
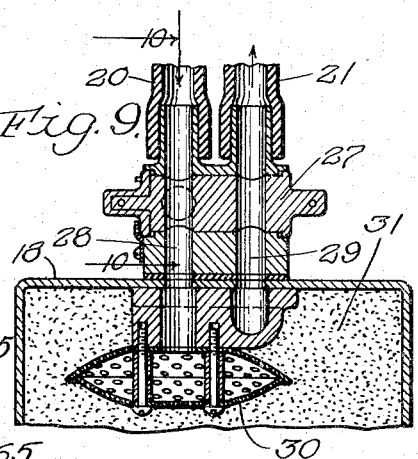
Figure 10:
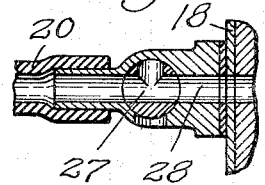
Figure 11:
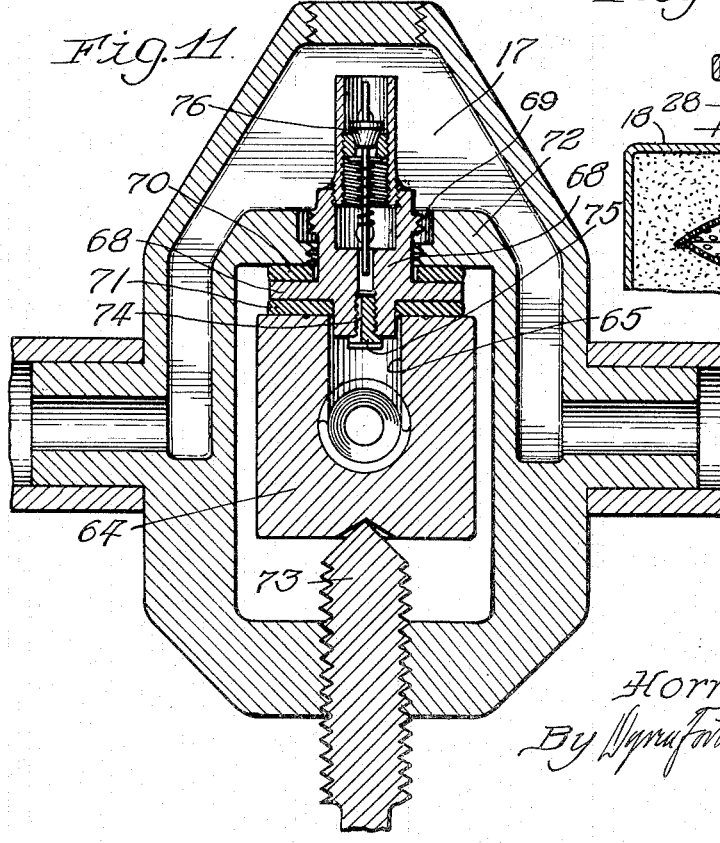

Fig. 1 is a side elevation of the complete unit; Fig. 2 is a vertical sectional view of the major portion of the device; Fig. 3 is a view, partly in section, along the line 3—3 of Fig. 2; Fig. 4 is a view of the head plate of the bellows, along the line 4—4 of Fig. 2; Fig. 5 is a detailed view of the bearing, along the line 5—5 of Fig. 3; Fig. 6 is a view of the slidably pivoted connection between the cross-head and one of the longitudinally movable members, along the line 6—6 of Fig. 3; Fig. 7 is a view along line 7—7 of Fig. 2; Fig. 8 is a detailed view of the air tubes, along the line 8—8 of Fig. 2; Fig. 9 is a horizontal sectional view of these tubes, along the line 9—9 of Fig. 2; Fig. 10 is a detailed sectional view along the line 10—10 of Fig. 9; and Fig. 11 is a horizontal sectional view of the valve structure admitting oxygen to the measuring chamber, along the line 11—11 of Fig. 2.

Referring more particularly to Figs. 1 and 2, the construction and operation of the device in general will be described. The device comprises a frame 15, an oxygen bottle 16 or storage means for oxygen under considerable pressure, a measuring chamber 17, a chamber 18 adapted to contain chemicals, an expansible breather bag or bellows 19, breather tubes 20 and 21, and a recording device 22 for making a permanent record of the rate of oxygen consumption. In general, a patient breathes through the breather tubes until a normal rate of breathing has been obtained, and then a predetermined amount of oxygen, measured in a chamber 17, is admitted to the expansible bellows 19, and then breathed by the patient. Carbon dioxide is substantially removed from the exhalations by the chemicals in the chamber 18, and the oxygen in the bellows 19 is gradually consumed until the predetermined amount admitted thereto has been used up. The rate of oxygen consumption, calculated from the length of time needed to consume the predetermined amount of oxygen, as recorded by the means 22, is then used to calculate the metabolic rate of the patient or to derive other information.

The various portions of the machine will now be considered more in detail. The breather tubes 20 and 21 have on the outer end thereof a mouthpiece 23 adapted to be held in the mouth between the teeth and the lips. A flexible support 24 is provided for the tubes in order that they may be adjusted, during the taking of a test, so that no weight is supported by the patient's mouth. This support 24 is threaded on to a stud 25 passing through the wall of the chamber 18, which stud is preferably soldered to the interior of the chamber and reinforced to prevent turning, by the bracket 26. The inner ends of the tubes connect, through the rotatable valve 27, to the passages 28 and 29 leading into the chamber. The passage 28 terminates in a perforated member 30 lying within the chemical 31 in the chamber 18, this member being adapted to provide a large surface of contact with the chemical in order to insure the exhaled air passing through as large a proportion as possible of the chemical used. In this particular embodiment the chemical used to absorb the carbon dioxide from the exhaled air is what is commonly known as "soda lime" or calcium oxide with sodium hydroxide. This chemical is exposed to water vapors before being used, and has a water content of about 80% of saturation, in order to prevent the picking up of moisture from the breath with consequent crystallization of the chemical and clogging of the device. The passage 29 extends upwardly to the centrifugal pump 32 driven by the motor 33. Gas or fluid in the expansible bellows 19 is drawn through the perforated screen member 34 which forms one side of the chamber 18, up through the passage 35, and then driven by the centrifugal pump out through the breather tube 21 in a gentle stream, insuring that substantially all inhaled air will come from the tube 21, and all exhaled air return through the tube 20. The upper part of the perforated screen 34 is closed, as by the plate 36. This plate serves to prevent the gas in the bellows from entering the passage 35 too directly, and also serves as a terminal or fastening means for one end of the flexible member 37 later to be described.

The expansible bellows 19 is preferably made of rubber, attached to the chamber 18 at one end, in fixed relation to the frame, and attached to a head-plate 38 at the other end. This head-plate is supported by the cross-head 39 and is free to move toward or away from the chamber 18. This head plate has an opening 40 therethrough normally closed by a valve-member 41 spring-pressed against the inner side of the opening by the flexible metal strip 42. The flexible member or chain 37 has one end attached to the valve-member 41 and the other end attached to the plate 36. The latter-mentioned end of the chain is thus fixedly attached to a point removed from the valve member, here the wall of the chamber directly opposite the head-plate, and thus movement of the head-plate 38 away from the chamber to a point further than the length of the chain 37 results in the uncovering of the opening 40 and the venting of any gas in the bellows to the outer air. This is an important safety feature, since an inexperienced or careless operator could release into the bellows a larger amount of oxygen than the bellows is adapted to contain, which amount would burst the bellows unless some safety features were provided.

As heretofore stated, the head-plate 38 which forms the movable end of the bellows 19 is supported, referring more particularly to Figs. 3–6, by a cross-head 39 carried by longitudinally movable rod members 43 and 44. The cross-head is rigidly fastened to the rod-member 43 as by the set screw 45, but is loosely slidably pivoted to the rod-member 44 at its other end, as by the bolt 46. It will be noted that at this end the cross-head 39 is provided with a slot 47 surrounding the bolt or pivot-member 46. In this manner slight irregularities in spacing, parallelism, and longitudinal movement of the rod members 43 and 44 is compensated for, and firm support is provided for the cross-head 39 without any possibility of jamming during movement.

Guide-members 48 and 49 are provided for the longitudinally movable rod members 43 and 44, said guide-members being here shown as substantially tubular members having opposed longitudinal slots 50 and 51 through which the cross-head 39 extends therewithin. The guide-members are supported on the frame 15, as by the screws 52 and 53, which screws also serve to hold within the guide-members the bearings 54 and 55 supporting the rod-members. These bearings, and similar bearings 56 and 57 are alike, so the bearing 57 only will be described. It is provided with an opening 58 therethrough, slightly larger than the diameter of the rod member 44 which passes therethrough, and has in the bottom of the opening a roller 59 supporting said rod, and in turn supported by ball bearings 60. In this manner the end-plate 38 moves back and forth very readily, and the slight pressure caused by inhaling and exhaling causes a movement of the end-plate 38 and the longitudinal members 43 and 44.

A pen-holder 61 is carried by one of these longitudinally movable rod members, here 43, and is adapted to record the movements of the rod, and consequently of the end-plate of the bellows, on a card 62 carried by the card-holder and clock-container 63, the card 62 moving slowly downward at the rate of approximately an inch a minute.

The oxygen bottle 16 is one of the common commercial type carrying oxygen compressed therein to a high pressure. Referring more particularly to Figs. 2 and 11, the oxygen bottle 16 has a head 64 provided with an opening 65 in the side thereof and a manually rotatable valve-member 66 adapted to open or close this passage when rotated by the removable handle 67. A valve mechanism 68 is provided in an opening 69 in the wall of the portion of the measuring chamber 17 adjacent the opening 65, and gaskets 70 and 71 are provided, the first sealing the valve-device 68 against the wall 72 of the chamber 17, and the second sealing the head 64 against the valve-device 68. Means for holding the oxygen bottle head in position, and maintaining or releasing pressure against the gaskets 70 and 71, is provided in the form of a screw-threaded pressure member 73, adapted to be also rotated by the handle 67. The valve-device 68 is provided with a very narrow entrance opening, here shown as a slot 74 in the side of the screw 75 in the end thereof, which slot leads through a common type of spring-pressed one-way valve 76 to the interior of the chamber 17. The very small opening 74 is provided in order that there will not be an excessive rush of oxygen from the bottle 16 if an inexperienced operator opens the valve 66 too wide. It will be noted that the valve-device 68 is threaded into place through the wall 72, but when completely screwed in is loosely mounted in the opening 69 in said wall, so that there is a small amount of play possible. Pressure of the holding-means 73, transmitted through the head 64 of the oxygen bottle, normally holds this valve-device 68 tightly sealed against both the wall 72 and the head 64; when it is desired to release this seal, however, it is only necessary to release the pressure exerted by the member 73 and the seal will be broken, allowing any gas or fluid under pressure in the measuring chamber 17 to escape between the wall 72 and the gaskets 70 to the atmosphere.

The measuring-chamber 17 is used in combination with the pressure gauge 77 to measure out a predetermined amount of oxygen to be released into the expansible bellows 19, generally one liter. In operation, all valves are first closed, with valve 27 in such a position that the patient may both inhale and exhale through the tube 20. After the mouthpiece has been arranged and the nostrils closed by a clip not here shown, the valve is turned to permit breathing through the passages 28 and 29, which is carried on until a normal rate of breathing has existed for a minute or two. Valve 66 in the head of the oxygen bottle is then opened and oxygen admitted into the measuring chamber 17 and the pressure gauge 77 reads a pressure determined in accordance with the size of the measuring chamber, the height of the apparatus above sea level, and the room temperature, the object being to release one liter of oxygen at standard conditions into the bellows 19 when desired. The valve 66 is then closed, and the oxygen held in the chamber 17 until desired for use. Should too large an amount of oxygen be admitted to the measuring chamber 17, it is only necessary to release the seal of the valve-device 68 by turning back the screw member 73. When the proper amount of oxygen is present in the chamber 17, and the patient's breathing is substantially constant, the valve 78 is opened to admit the oxygen, through the passage 79, into the expansible bellows 19. The test is then carried on, as heretofore outlined, until a liter of oxygen has been consumed by the patient being tested.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I claim as new and desire to secure by Letters Patent is:

1. A device of the character described for measuring the rate of consumption of oxygen, including: a frame; an expansible bellows having one end thereof fixed with respect to said frame; a pair of guide members on said frame; longitudinally movable members supported by said guide members; and mounting means on said movable members supporting the other end of said bellows.

2. A device of the character described for measuring the rate of consumption of oxygen, including: a frame; a chamber on said frame for chemicals; an expansible bellows having one end thereof attached to said chamber; a pair of guide members on said frame; longitudinally movable members supported by said guide members; and a cross-head between said two movable members supporting the other end of said bellows.

3. A device of the character described for measuring the rate of consumption of oxygen, including: a frame; a chamber on said frame for chemicals; an expansible bellows having one end thereof attached to said chamber; a pair of guide members on said frame; bearings on said guide members; longitudinally movable members supported by said bearings; and a cross-head between said two movable members supporting the other end of said bellows.

4. A device of the character described for measuring the rate of consumption of oxygen, including: a frame; a chamber on said frame for chemicals; an expansible bellows having one end thereof attached to said chamber; a pair of substantially tubular guide members on said frame having opposed longitudinal slots; bearings in said guide members; longitudinally movable rod members carried by said bearings; and a cross-head between said two movable members supporting the other end of said bellows.

5. Apparatus of the character claimed in claim 4, wherein said cross-head is rigidly attached to one of said rod-members and slidably pivoted to the other of said rod-members.

6. A device of the character described for measuring the rate of consumption of oxygen, including: a frame; a chamber for chemicals mounted on said frame; a head-plate movable with respect to said frame; an expansible bellows connecting said head-plate to said chamber; a vent opening in said head-plate; a spring-pressed valve member normally closing said opening; and a flexible member connecting said valve member to said chamber, whereby said valve member is removed from said opening when said bellows has expanded a predetermined amount.

7. A device of the character described for measuring the rate of consumption of oxygen, including: a measuring chamber having an opening through the wall thereof; a valve device seated in said opening and having a spring-pressed movable valve member therein adapted to admit oxygen from an oxygen bottle to said chamber but prevent its return therefrom; and means for releasing said valve device from its seat in said opening whereby said oxygen is released from said chamber.

8. A device of the character described for measuring the rate of consumption of oxygen, including: a measuring chamber having an opening through the wall thereof; a valve device loosely mounted in said opening; an oxygen bottle; and means for holding the outlet of said oxygen bottle adjacent said valve-device and sealing said valve-device in said opening, whereby oxygen may be admitted to said chamber from said bottle, said means being so constructed and arranged that said valve-device seal may be released to permit oxygen to escape from said chamber.

9. A device of the character described for measuring the rate of consumption of oxygen, including: a measuring chamber having an opening through the wall thereof; a valve-device loosely mounted in said opening and having an outer portion larger than said opening, said device having a one-way valve therein; a gasket between said enlarged portion and the wall of said chamber around said opening; a second gasket on the outermost portion of said valve-device; an oxygen bottle having a head adapted to lie with the opening therethrough adjacent said gasket; and means for pressing said oxygen bottle head against said gasket, whereby said valve-device is sealed against said head and in said opening.

10. Apparatus of the character described for measuring the rate of consumption of a fluid, including: a relatively fragile expansible bellows; means for admitting to said bellows a fluid under pressure sufficient to rupture said bellows; a safety release vent opening in said bellows; a spring pressed valve member normally closing said opening; and a flexible member connecting said valve member to a point in said bellows removed from said valve member and with respect to which said valve member moves when said bellows expands, whereby said valve is opened when said bellows has expanded a predetermined amount.

HORRY M. JONES.